April 29, 1941.  A. E. JACKMAN, JR  2,239,893
POWER REVERSE GEAR
Filed Jan. 10, 1940  3 Sheets-Sheet 1

INVENTOR:
Arthur E. Jackman, Jr.
HIS ATTORNEYS.

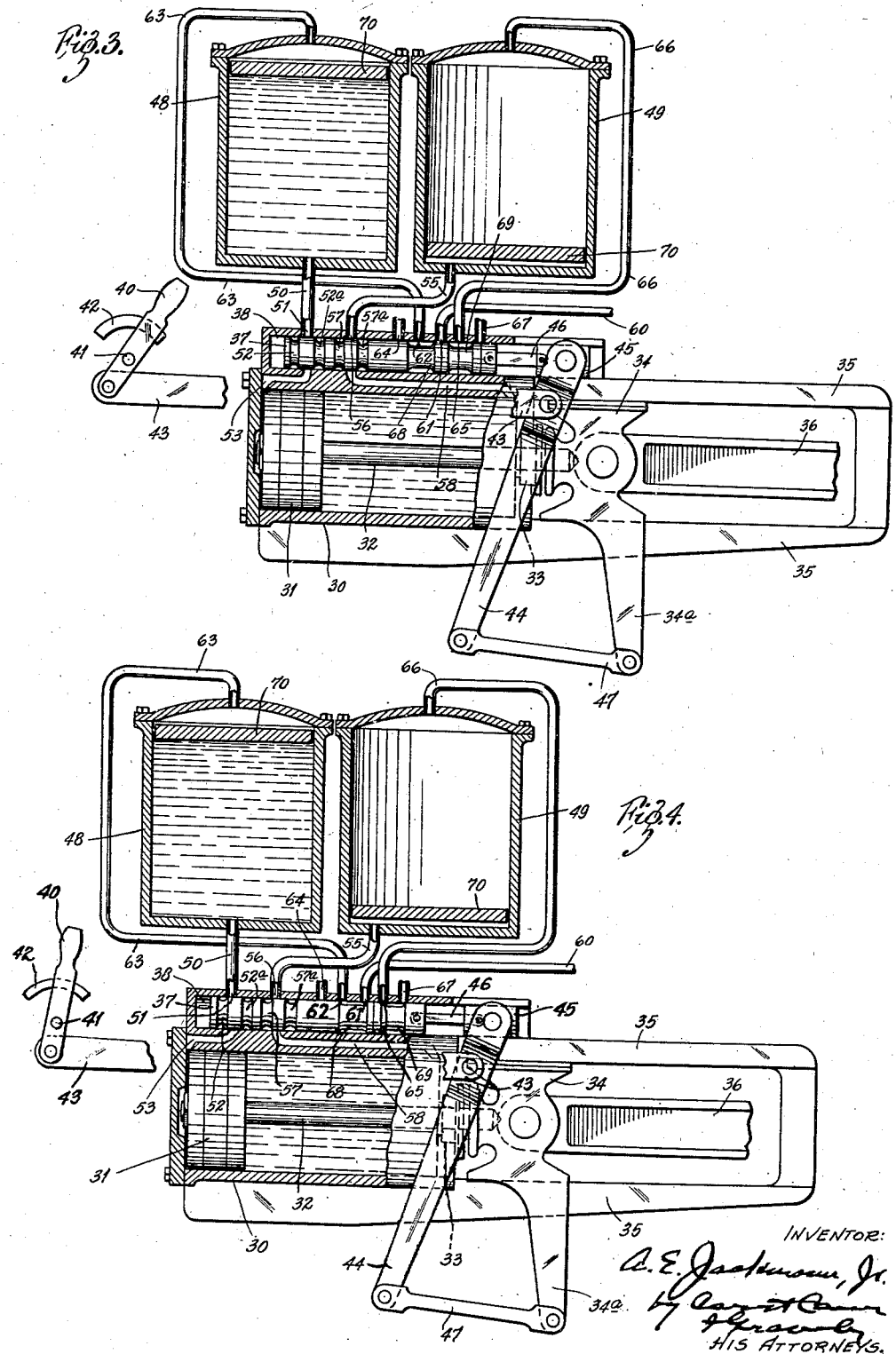

April 29, 1941.　　　A. E. JACKMAN, JR　　　2,239,893
POWER REVERSE GEAR
Filed Jan. 10, 1940　　　3 Sheets-Sheet 3

INVENTOR:
Arthur E. Jackman, Jr.
HIS ATTORNEYS.

Patented Apr. 29, 1941

2,239,893

UNITED STATES PATENT OFFICE 2,239,893

POWER REVERSE GEAR

Arthur E. Jackman, Jr., Canton, Ohio, assignor to The Timken Roller Bearing Company, Canton, Ohio, a corporation of Ohio Application January 10, 1940, Serial No. 313,168

4 Claims. (Cl. 121—40)

My invention relates to power operators and more particularly to fluid actuated power reverse gears for operating the reverse or valve gears of steam locomotives.

The principal object of my invention is to provide a simple, inexpensive and easy operable fluid actuated power reverse gear that will accurately adjust the valve gear and positively lock it in the selected position of adjustment, thus preventing power losses and speed variations; and also to provide a self-contained power reverse gear which is self lubricating. Further objects will appear hereinafter.

My invention consists principally in a locomotive power reverse gear in which a cylinder having a piston connected to the locomotive valve gear is actuated by an incompressible liquid under pressure, controlled by a valve which is manually opened by a lever in the locomotive cab and is closed by the movement of said piston; and it also consists in the parts and combinations and arrangements of parts hereinafter described and claimed.

Figure 1:
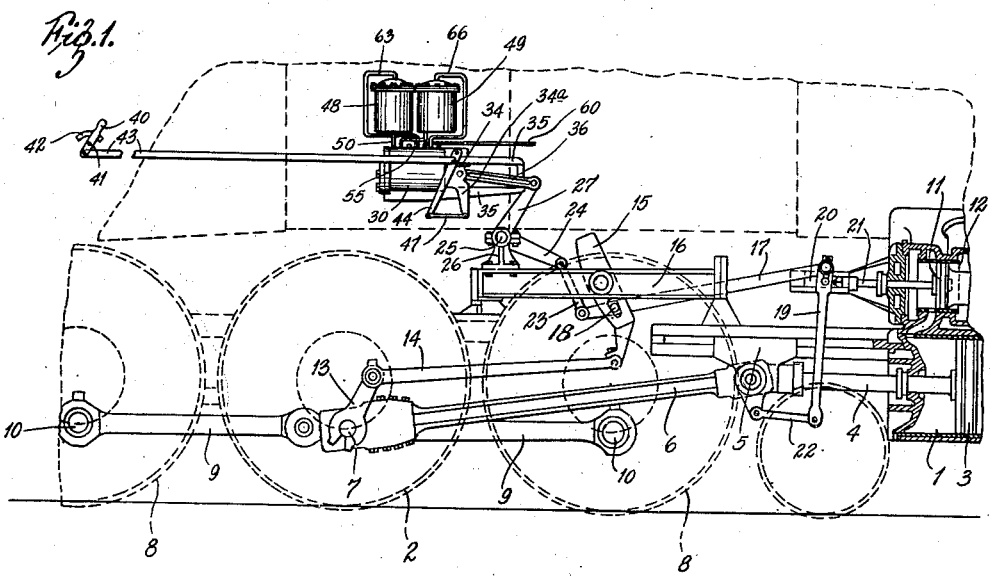

In the accompanying drawings, which form part of the specification and wherein like reference numerals refer to like parts wherever they occur, Fig. 1 is a side elevation of a portion of a locomotive, illustrating a power reverse gear embodying my invention in connection with the valve gear or link motion of said locomotive; and Figs. 2, 3, 4, 5 and 6 are enlarged central longitudinal vertical sectional views through said power reverse gear, illustrating the operation thereof.

In Fig. 1 of the accompanying drawings, a power reverse gear embodying my invention is shown connected to a valve gear or link motion of the kind used on steam locomotives for controlling the admission of steam to and its exhaust from the steam cylinder thereof so that the locomotive may be run either forward or backward or brought to a stop.

In accordance with common practice, power is transmitted from the steam cylinder 1 on each side of the locomotive to the main driving wheel 2 on that side thereof through a piston 3 which works in said cylinder and has a piston rod 4 secured to a slidably supported crosshead 5, and a main rod 6 which is pivoted at one end to said crosshead and at its other end to a main crank pin 7 fixed to said main driving wheel. The power is distributed through the main rod 6 to the adjoining driving wheels 8 by means of side rods 9 connected at their adjacent ends to the main crank pin 7 and at their remote ends to crank pins 10 fixed to the respective driving wheels 8.

The slide valve 11, which controls the admission of steam to and its exhaust from the locomotive cylinder 1, works in the steam chest 12 of said cylinder and is mechanically operated from an eccentric crank 13 fixed to the main crank pin 7, an eccentric rod 14 pivoted at one end to said eccentric crank and at its other end to one end of a reverse link 15 pivoted at its center on a bracket 16, and a radius rod 17 having a slot-and-pin connection 18 near one end with said reverse link and a pivotal connection at its other end with one end of a combination lever 19 which is pivoted near said end on a slidably supported crosshead 20 that is secured to the stem 21 of said slide valve and has a link connection 22 at its opposite end with the main crosshead 5.

The reverse or valve gear or motion work, by which the engineman changes the position of the distribution valve 11 to stop the locomotive or run it forward or backward, comprises a lifting link 23 pivoted at its lower end to the rear end of the radius rod 17 and at its upper end to the end of an arm 24 fixed to a lifting or tumbling shaft 25 that is journaled in bearings or boxes 26 and has an upstanding arm 27 that is adapted to be operated by my power reverse gear. The arrangement thus far described is well known and it is considered unnecessary to illustrate it in detail.

My power reverse gear, which is preferably mounted on the right hand side of the locomotive just forward of the cab and below the running board, comprises a horizontal power cylinder 30, and a piston 31 reciprocable in said cylinder, and provided with a piston rod 32 passing through a stuffing box 33 in the front end of said cylinder and connected to a crosshead 34 slidable on guides or ways 35 projecting from said end of said cylinder. The crosshead 34 is connected by a connecting rod 36 to the upper arm 27 fixed to the reverse or tumbling shaft 25, whereby the piston 31 is operatively connected to the reverse gear to actuate the same.

The operation of the power reverse gear is controlled by a cylindrical piston valve 37 reciprocable in a longitudinal valve bore or chamber 38 provided therefor in the top of the power cylinder 30. This power cylinder control valve 37 is manually controlled by the engineman through a reverse lever 40 located in the locomotive cab and pivoted, as at 41, for movement along a sector or quadrant 42. The reverse lever 40 is pivotally connected at its lower end to the rear end of a forwardly extending reach rod 43 whose forward end is pivotally connected to a rock arm 44 which is pivotally supported at its upper end on a crosshead 45 that is slidable in the forward end of the valve bore 38 and is connected by means of a link 46 to the forward end of the piston valve 37. The rock arm 44 extends downwardly across the forward end of the power cylinder 30 at one side of the piston rod 32 and has a link connection 47 with a lug 34a that depends from the crosshead 34 to which said piston rod is fixed. The piston 31 is actuated in the power cylinder 30 by an operating fluid contained in two reservoirs 48 and 49 of the same capacity mounted on the side of the locomotive just above said cylinder, said fluid being a hydraulic brake fluid which is not effected by temperature changes and is practically incompressible.

Communication is established between the reservoir 48 and the rear end of the power cylinder 30 through a conduit 50 leading from said reservoir to a port 51 in the top of the cylindrical valve bore 38, thence through either of two longitudinally spaced annular grooves 52, 52a in the piston valve 37 and thence through a port 53 that opens at one end into the bottom of said valve bore opposite the port 51 therein and at the other end into said cylinder at the rear end thereof. Communication is established between the reservoir 49 and the front end of the power cylinder 30 through a conduit 55 leading from the bottom of said reservoir to a port 56 in the top of the valve bore, thence through either of two longitudinally spaced annular grooves 57, 57a in the piston valve 37 and thence through a port 58 that opens at one end into the bottom of said valve bore opposite the port 56 therein and at the other end into said cylinder at the front end thereof.

Movement is imparted to the operating fluid contained in the reservoirs 48 and 49 by means of air supplied thereto under pressure. Such air is supplied from a suitable source of supply through a supply conduit 60 that opens into the valve bore 38 through an air inlet port 61 in the top thereof. The valve bore has an air outlet port 62, which communicates with the top of the reservoir 48 through a conduit 63, and an air exhaust port 64 open to the atmosphere. Said valve bore also has an air outlet port 65, which communicates with the top of the reservoir 49 through a conduit 66, and an air exhaust port 67 open to the atmosphere, all of said air ports being spaced apart longitudinally of said valve chamber. The piston valve 37 has two longitudinally spaced grooves 68 and 69 therein. The groove 68 is adapted to establish communication between the air supply and the top of the reservoir 48 through the ports 61 and 62 or to establish communication between the top of said reservoir and the atmosphere through the port 62 and the exhaust port 64. The groove 69 is adapted to establish communication between the air supply and the top of the reservoir 49 through the ports 61 and 65 or to establish communication between the top of said reservoir and the atmosphere through the port 65 and the exhaust port 67. The longitudinal spacing of the annular grooves 68 and 69 in the piston valve and the air ports in the valve bore is such that when either one of the two reservoirs 48 and 49 is in communication with the atmosphere, the fluid in the other reservoir is under air pressure.

Resting on the operating fluid in the reservoirs 48 and 49 are floating pistons 70 adapted to prevent disturbance of the hydraulic fluid by the entrance of air in the tops of said reservoirs. These pistons may be of wood, cork or metal. If wood or cork, they are preferably varnished so as to make them moisture proof.

Figure 2:
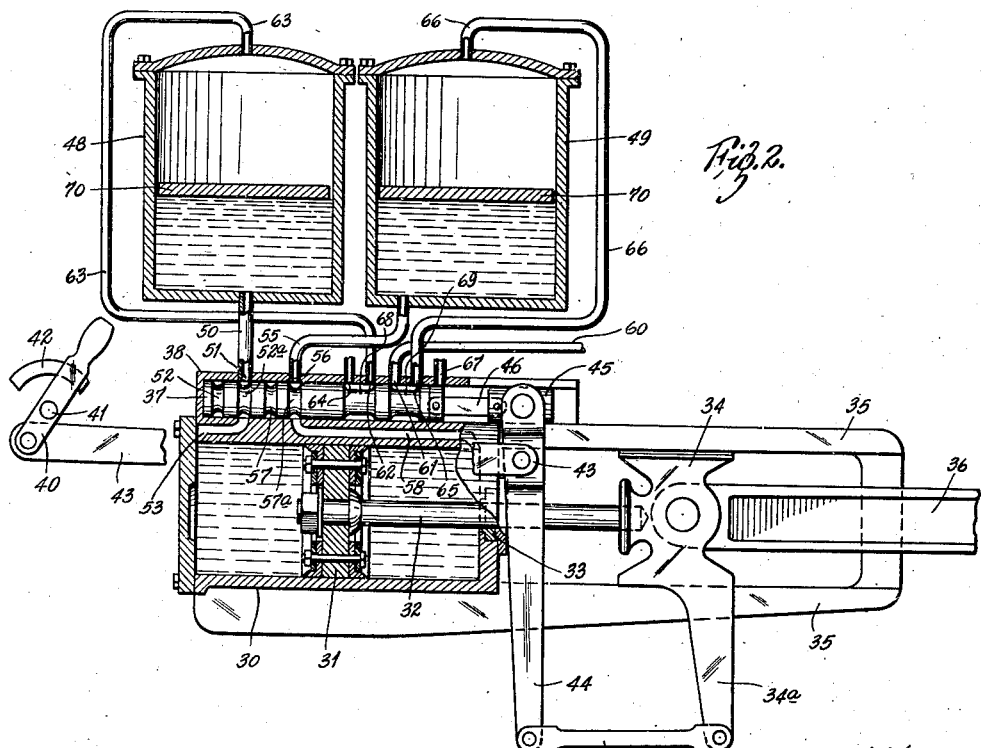

By the arrangement described, the steam cylinder valve 11 is set for forward movement of the locomotive by moving the reverse lever 40 forwardly past its dead center position on its quadrant 42. As shown in Fig. 2, this movement of the reverse lever pulls the reach rod 43 which carries with it the upper end of the rock arm 44, thereby moving the piston valve 37 rearwardly in its bore 38 until it abuts against the rear end of the latter. In this position of the piston valve, the port 53 in the rear end of the power cylinder 30 is placed in communication with the bottom of the reservoir 48 through the annular groove 52a; the port 58 in the front end of said cylinder is placed in communication with the bottom of the reservoir 49 through the annular groove 57a; the upper portion of the reservoir is placed in communication with the air supply through the port 61, annular groove 69 and port 65; and the upper end of the reservoir 48 is placed in communication with the atmosphere through the port 62, annular groove 68 and exhaust port 64. On the rearward position of the piston valve, air under pressure is supplied to the upper portion of the reservoir 49 and forces the hydraulic fluid therein through the conduit 55, port 56, annular groove 57a and port 58 into the forward end of the power cylinder, thereby shifting the piston 31 rearwardly therein, displacing part of the hydraulic fluid at the rear of said piston through the port 53, annular passageway 52a, port 51 and conduit 50 into the reservoir 48, and exhausting the air from the upper portion of the reservoir 48 through the conduit 63, port 62, annular passageway 68 and exhaust port 64. This rearward travel of the piston 31 in the power cylinder 30 also causes the crosshead 34 to move rearwardly with said piston and operates the reverse gear through the connecting rod 36 in a direction that will bring about the desired steam valve travel as initially determined by the position of the reverse gear lever 40 on its quadrant 42 in the locomotive cab. When the piston 31 reaches the position required to effect the desired steam valve travel, the cross head 34 and union link 47 have also moved rearwardly with said piston to thereby cause the rock arm 44 to pivot about its point of connection with the reach rod 43 and pull the piston valve 37 pivotally connected to the upper end of said rock arm forwardly in its valve bore to its original central position, as shown in Fig. 3. In this position of the piston valve, it operates to cut off communication between the ports 53 and 58 and the respective reservoirs 48 and 49, thus locking the fluid in the power cylinder on opposite sides of the piston therein whereby said piston is positively held against endwise movement in said cylinder by the relative incompressibility of the hydraulic fluid therein. In this position of the piston valve, the piston cuts off communication between the reservoirs 48 and 49 and the air inlet and exhaust ports. To reverse the locomotive the same operations as above described are repeated in a reverse direction, whereupon the piston is locked in the power cylinder in the position shown in Fig. 6.

Figure 5:
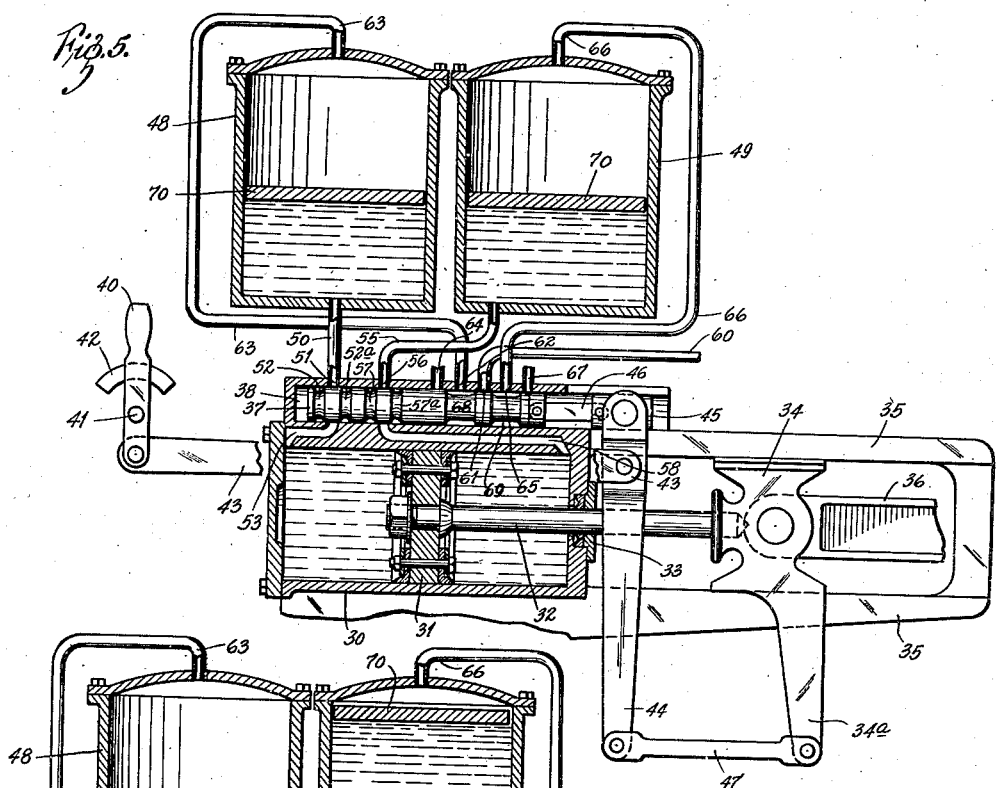
Figure 6:
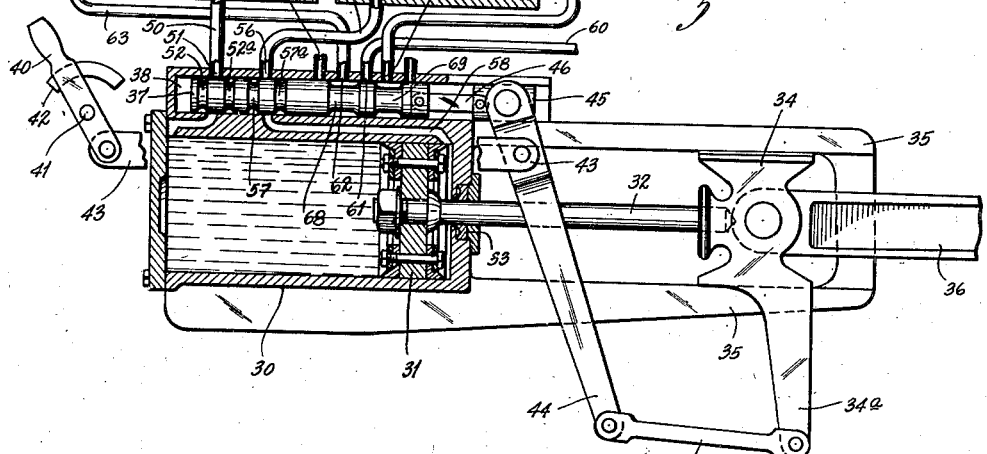

When the reverse lever 40 is in central or neutral position on its quadrant 42, the reverse gear is in dead center position and the locomotive is at rest. In this position of the reverse lever, the piston valve is shifted forwardly to the position shown in Fig. 4, so as to supply fluid under pressure to the rear end of the power cylinder and thus shift said piston valve to central position, as shown in Fig. 5 to thereby lock the fluid in said cylinder on opposite sides of said piston.

The hereinbefore described power reverse gear has numerous advantages. It is simple and economical in construction and enables the valve gear or link motion which controls the steam cylinder valve to be easily and accurately adjusted so that the locomotive may be run forward or backward or brought to a stop. Movement of the reverse lever to its desired position of adjustment shifts the piston valve to a position that will supply fluid pressure to the power cylinder on the side of the piston therein required to move said piston and the valve gear actuated thereby in the proper direction, after which the piston valve is automatically returned by such movement of the piston to a position that will lock the operating fluid in said cylinder and thus prevent any endwise creeping of said piston. The piston valve and cylinder are inexpensive to manufacture and require little attention. The device is self contained and self-lubricating and there is no loss of operating fluid; and the large fluid reservoirs provide for stable operation.

Obviously, the hereinbefore described arrangement admits of considerable modification. Therefore, I do not wish to be limited to the precise construction shown and described.

What I claim is:

1. A power operator comprising a cylinder having ports in opposite ends thereof, a piston reciprocable in said cylinder, separate reservoirs for supplying an operating liquid to and for receiving a return flow from said cylinder through the ports thereof, means for supplying fluid pressure to said reservoirs, ports for exhausting such fluid from the respective reservoirs, a single valve slidable longitudinally of said cylinder and manually operable to simultaneously establish at either end of its sliding movement communication between said reservoirs and said cylinder ports, between said fluid pressure supply and one of said reservoirs and between the other of said reservoirs and the exhaust port therefor and for cutting off communication between said fluid pressure supply and the reservoir open to the exhaust port therefor and between the reservoir open to said fluid pressure and the exhaust port for said last mentioned reservoir, and a mechanical connection between said piston and said valve, whereby said valve is adapted to move with said piston and cut off communication between said cylinder and said reservoirs and between the latter and said fluid pressure supply at a predetermined point in the travel of said piston in either direction.

2. A power operator comprising a cylinder having ports in opposite ends thereof, a piston reciprocable in said cylinder, separate reservoirs for supplying an operating liquid to and for receiving a return flow from said cylinder through the ports thereof, means for supplying fluid pressure to said reservoirs, ports for exhausting such fluid from the respective reservoirs, a single valve slidable longitudinally of said cylinder and manually operable to simultaneously establish at either end of its sliding movement communication between said reservoirs and said cylinder ports, between said fluid pressure supply and one of said reservoirs and between the other of said reservoirs and the exhaust port therefor and for cutting off communication between said fluid pressure supply and the reservoir open to the exhaust port therefor and between the reservoir open to said fluid pressure and the exhaust port for said last mentioned reservoir and a mechanical connection between said piston and said valve, whereby said valve is adapted to move with said piston and cut off communication between said cylinder and said reservoirs and between the latter and said fluid pressure supply at a predetermined point in the travel of said piston in either direction, said mechanical connection comprising a crosshead movable with said piston, a link pivoted at one end to said crosshead, an arm pivoted at one end to said slide valve and at its other end to said link, and a manually operable reach rod pivoted to said arm between said ends thereof and about which said arm is adapted to pivot during the mechanical operation of said valve.

3. A power operator comprising a cylinder having ports in opposite ends thereof, a piston reciprocable in said cylinder, a single slide valve slidable longitudinally of said cylinder, separate reservoirs for supplying an operating liquid to and for receiving a return flow from said cylinder through the ports thereof, floats snugly fitting within said reservoirs, means for supplying fluid pressure to the upper ends of said reservoirs, ports for exhausting such fluid from the respective reservoirs, a single control valve slidable longitudinally of said cylinder, manually operable means for operating said valve to simultaneously establish at either end of its sliding movement communication between said reservoirs and said cylinder ports, between said fluid pressure supply and one of said reservoirs and between the other of said reservoirs and the exhaust port therefor and for cutting off communication between said fluid pressure supply and the reservoir open to the exhaust port therefor and between the reservoir open to the exhaust port for said last mentioned reservoir, and a mechanical connection between said piston and said valve whereby said valve is adapted to move with said piston to cut off communication between said cylinder and said reservoirs and between the latter and said fluid pressure supply at a predetermined point in the travel of said piston in either direction, said manual valve operating means comprising a manually operable reach rod movable longitudinally of said cylinder, an arm pivoted between its ends on said reach rod for swinging movement in a plane parallel to the axes of said cylinder and slide valve and pivoted at one end to said valve, and a supporting pivot for the other end of said arm.

4. A power operator comprising a cylinder having ports in opposite ends thereof, a piston reciprocable in said cylinder, a single slide valve slidable longitudinally of said cylinder, separate reservoirs for supplying an operating liquid to and for receiving a return flow from said cylinder through the ports thereof, floats snugly fitting within said reservoirs, means for supplying fluid pressure to the upper ends of said reservoirs, ports for exhausting such fluid from the respective reservoirs, a single control valve slidable longitudinally of said cylinder, manually operable means for operating said valve to simultaneously establish at either end of its sliding movement communication between said reservoirs and said cylinder ports, between said fluid pressure supply and one of said reservoirs and between the other of said reservoirs and the exhaust port therefor and for cutting off communication between said fluid pressure supply and the reservoir open to the exhaust port therefor and between the reservoir open to the exhaust port for said last mentioned reservoir, and a mechanical connection between said piston and said valve whereby said valve is adapted to move with said piston to cut off communication between said cylinder and said reservoirs and between the latter and said fluid pressure supply at a predetermined point in the travel of said piston in either direction, said manual valve operating means comprising a manually operable reach rod movable longitudinally of said cylinder, an arm pivoted between its ends on said reach rod for swinging movement in a plane parallel to the axes of said cylinder and slide valve and pivoted at one end to said valve, and a supporting pivot for the other end of said arm, said mechanical connection comprising a crosshead movable with said piston, and a link pivotally connected at one end to said crosshead and having a pivotal connection at its other end with said other end of said arm that constitutes said supporting pivot therefor.

ARTHUR E. JACKMAN, Jr.